(12) United States Patent
Jeffries et al.

(10) Patent No.: US 6,807,576 B1
(45) Date of Patent: Oct. 19, 2004

(54) METHOD AND SYSTEM FOR DETERMINING AND GRAPHICALLY REPRESENTING FRAME CLASSIFICATION RULE RELATIONSHIPS

(75) Inventors: Clark Debs Jeffries, Durham, NC (US); Victoria Sue Thio, Cary, NC (US); Alex Warshavsky, Atlit (IL); Avraham Zehavi, Naharia (IL)

(73) Assignee: International Business Machines Corporation, Armonk, NY (US)

( * ) Notice: Subject to any disclaimer, the term of this patent is extended or adjusted under 35 U.S.C. 154(b) by 746 days.

(21) Appl. No.: 09/658,299

(22) Filed: Sep. 8, 2000

(51) Int. Cl.[7] ............................................. G06F 15/173
(52) U.S. Cl. ....................... 709/225; 709/217; 709/249; 707/2; 707/3; 707/7; 707/101; 707/102; 345/764
(58) Field of Search ............................. 709/225, 249, 709/217; 707/303, 101, 102; 345/764

(56) References Cited

U.S. PATENT DOCUMENTS

| | | | |
|---|---|---|---|
| 5,835,727 A | 11/1998 | Wong et al. | 395/200.68 |
| 5,864,666 A | 1/1999 | Shrader | 395/187.07 |
| 5,899,991 A | 5/1999 | Karch | 707/5 |
| 5,951,651 A | 9/1999 | Lakshman et al. | 709/237 |
| 5,983,270 A | 11/1999 | Abraham et al. | 709/224 |
| 6,009,475 A * | 12/1999 | Shrader | 709/249 |
| 6,298,340 B1 * | 10/2001 | Calvignac et al. | 707/3 |
| 6,473,763 B1 * | 10/2002 | Corl, Jr. et al. | 707/101 |
| 6,484,171 B1 * | 11/2002 | Corl, Jr. et al. | 707/7 |
| 6,529,897 B1 * | 3/2003 | Corl, Jr. et al. | 707/2 |
| 6,539,394 B1 * | 3/2003 | Calvignac et al. | 707/102 |
| 6,677,963 B1 * | 1/2004 | Mani et al. | 345/764 |

FOREIGN PATENT DOCUMENTS

| | | | |
|---|---|---|---|
| WO | WO9921335 | 4/1999 | H04L/26/06 |

OTHER PUBLICATIONS

Hayden, et al., "Miro: Visual Specification of Security," *IEEE Transactions on Software Engineering*, vol. 16, No. 10, Oct. 1990, pp. 1185–1196.

Mayer, et al., "Firmato: A Novel Firewall Management Toolkit," *Proceeding on the 1999 Symposium on Security and Privacy*, IEEE, May 1999, pp. 17–31.

* cited by examiner

*Primary Examiner*—Jack B. Harvey
*Assistant Examiner*—Hai V. Nguyen
(74) *Attorney, Agent, or Firm*—Sawyer Law Group LLP

(57) ABSTRACT

A method and system for graphically representing relationships between a plurality of filter rules in a computer system is disclosed. The computer system includes a display. Each of the plurality of filter rules has a priority. The method and system include allowing entry of at least one filter rule of the plurality of filter rules and providing a graphical display of a first portion of the plurality of filter rules on the display. Each of the first portion of the plurality of filter rules is displayed hierarchically based on the priority of each of the first portion of the plurality of filter rules. If the first portion of plurality of filter rules includes a plurality of intersecting filter rules, then displaying the plurality of intersecting filter rules in the graphical display to indicate at least one intersection of at least one higher priority filter rule and at least one lower priority filter rule and to indicate that the at least one higher priority filter rule dominates the at least one lower priority filter rule.

31 Claims, 10 Drawing Sheets

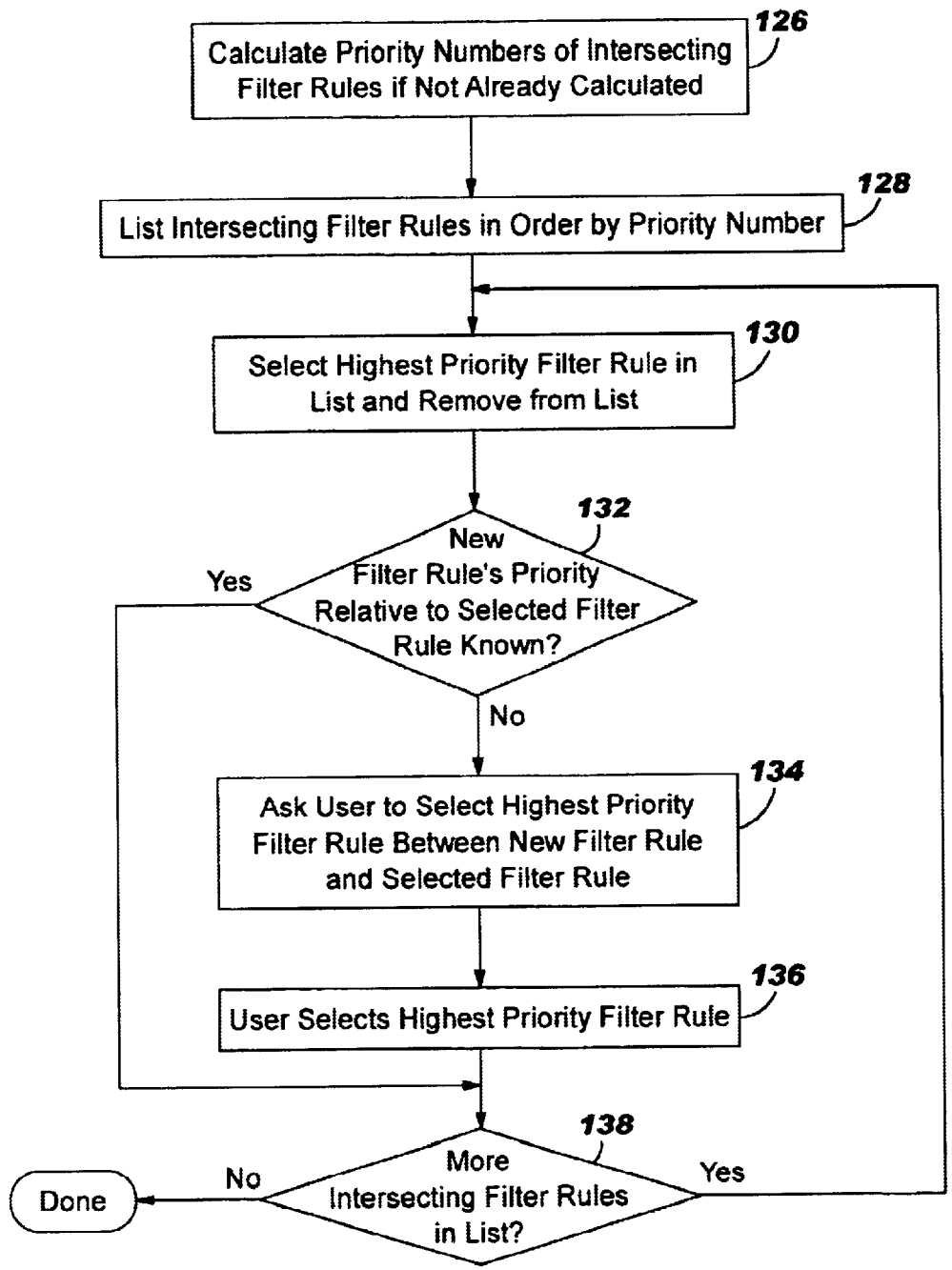

METHOD AND SYSTEM FOR DETERMINING AND GRAPHICALLY REPRESENTING FRAME CLASSIFICATION RULE RELATIONSHIPS

CROSS-REFERENCE TO RELATED APPLICATIONS

The present invention is related to U.S. patent application Ser. No. 09/312,148, entitled "SYSTEM METHOD AND COMPUTER PROGRAM FOR FILTERING USING TREE STRUCTURE" filed on May 14, 1999 and assigned to the assignee of the present application now issued as U.S. Pat. No. 6,898,340B1. The present invention is also related to U.S. patent application Ser. No. 09/540,333, entitled "SYSTEM METHOD AND COMPUTER PROGRAM FOR PRIORITIZING FILTER RULES" filed on Mar. 31, 2000 and assigned to the assignee of the present application now issued as U.S. Pat. No. 6,484,171B1.

FIELD OF THE INVENTION

The present invention relates to computer systems which utilize filter rules, and more particularly to a method and system for providing a graphical representation of filter rules.

BACKGROUND OF THE INVENTION

Networks typically include multiple hosts, at least one server and at least one switch and/or router. Networks may also include one or more gateways to the Internet. Traffic flows through the networks and must be routed by the switch or router. In order to manage communications in a network and route data packets through the switch, filter rules are used. A filter rule enforces a particular action on a packet matching the filter rule. Thus, a filter rule tests packets which are being transmitted via a network in order to provide a variety of services. A filter rule may test packets entering the network from an outside source to ensure that attempts to break into the network can be thwarted. For example, traffic from the Internet entering the network may be tested in order to ensure that packets from unauthorized sources are denied entrance. Similarly, packets from one portion of a network may be prevented from accessing another portion of the network and take other appropriate action, such as recording the attempted access. Filter rules may also be used to transmit traffic based on the priorities of packets. For example, packets from a particular host may be transmitted because the packets have higher priority even when packets from other hosts in the network are dropped. Filter rules may also be used to ensure that new sessions are not permitted to be started when congestion is high even though traffic from established sessions is transmitted. Other functions could be achieved based on the filter rule.

Filter rules test a key in order to determine whether the filter rule will operate on a particular packet. The key that is typically used is the Internet Protocol (IP) header of the packet. The IP header typically contains five fields of interest: the source address, the destination address, the source port, the destination port and the protocol. These fields are typically thirty-two bits, thirty-two bits, sixteen bits, sixteen bits and eight bits, respectively. Thus, the part of IP header of interest is typically one hundred and four bits in length. Filter rules typically utilize these one hundred and four bits, and possible more bits, in order to perform their functions. For example, based on the source and destination addresses, the filter rule may determine whether a packet from a particular host is allowed to reach a particular destination address. However, the key often contains additional bits other than the fields of the IP header. The additional bits may be used by a filter rule which manages traffic through a network. Thus, the filter rules typically operate using a key that includes at least some fields of the IP header of a packet and may include additional bits. When the key matches the filter rule, the filter rule enforces its action on the packet corresponding to the key.

The filter rules that control traffic through a network may intersect. In other words, a key for a particular packet may match multiple filter rules. Filter rules are thus accorded a priority. A higher priority filter rule identifies which filter rule to check first for a match. Thus, the higher priority filter rule controls the action taken on a particular packet. In other words, the higher priority filter rule dominates the lower priority filter rule. For example, if a key for a packet matches two (intersecting) filter rules, then the higher priority filter rule controls. This prevents conflicting actions from being taken on a particular filter rule. For example, a first filter rule may be a default filter rule, which treats most cases. A second filter rule can be an exception to the first filter rule. The second filter rule would typically have a higher priority than the first filter rule to ensure that where a packet matches both the first and the second filter rule, the second filter rule's action will be enforced.

Multiple filter rules are typically used for each network. Because the filter rules may intersect and have different priorities, it is desirable for the network administrator or other user to be able to ensure that the filter rules can adequately function together. For example, it would be undesirable to provide two intersecting filter rules of the same priority which specify that conflicting actions be taken. For example, it would be undesirable for a first rule to specify that a packet is dropped while a second intersecting rule of the same priority specifies that the packet be transmitted. In addition, it would be desirable for the network administrator to monitor other information about the filter rules, such as how often the filter rule is used and the actual structure of the filter rule in the computer system. Thus, the user should be able to obtain information about filter rules.

Conventional systems generally display information relating to filter rules in a table format. For example, a filter rule, the ranges of keys which match the filter rule and the action taken are typically displayed. However, other information may not be readily available. This information in a table format may also be difficult for a user to understand. Thus, the user may provide filter rules that intersect, are inconsistent and have the same priority. In such a case, a switch in the network may be unable to determine the appropriate action to enforce for a particular packet having a key that fits both filter rules. As a result, the traffic through the switch may not be properly controlled.

Accordingly, what is needed is a system and method for improving the access of a user to information relating to filter rules. The present invention addresses such a need.

SUMMARY OF THE INVENTION

The present invention provides a method and system for graphically representing relationships between a plurality of filter rules in a computer system. The computer system includes a display. Each of the plurality of filter rules has a priority. The method and system comprise allowing entry of at least one filter rule of the plurality of filter rules and providing a graphical display of a first portion of the plurality of filter rules on the display. Each of the first portion of the plurality of filter rules is displayed hierarchically based on the priority of each of the first portion of the plurality of filter rules. If the first portion of plurality of filter rules includes a plurality of intersecting filter rules, then displaying the plurality of intersecting filter rules in the graphical display to indicate at least one intersection of at least one higher priority filter rule and at least one lower priority filter rule and to indicate that the at least one higher priority filter rule dominates the at least one lower priority filter rule.

According to the system and method disclosed herein, the present invention provides a user, such as a network administrator, with the ability to easily identify relationships between filter rules and make desired adjustments to the filter rules.

BRIEF DESCRIPTION OF THE DRAWINGS

FIG. 4B is a flow chart of one embodiment of a method for determining the priority of filter rules in accordance with the present invention.

DETAILED DESCRIPTION OF THE INVENTION

The present invention relates to an improvement in computer systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
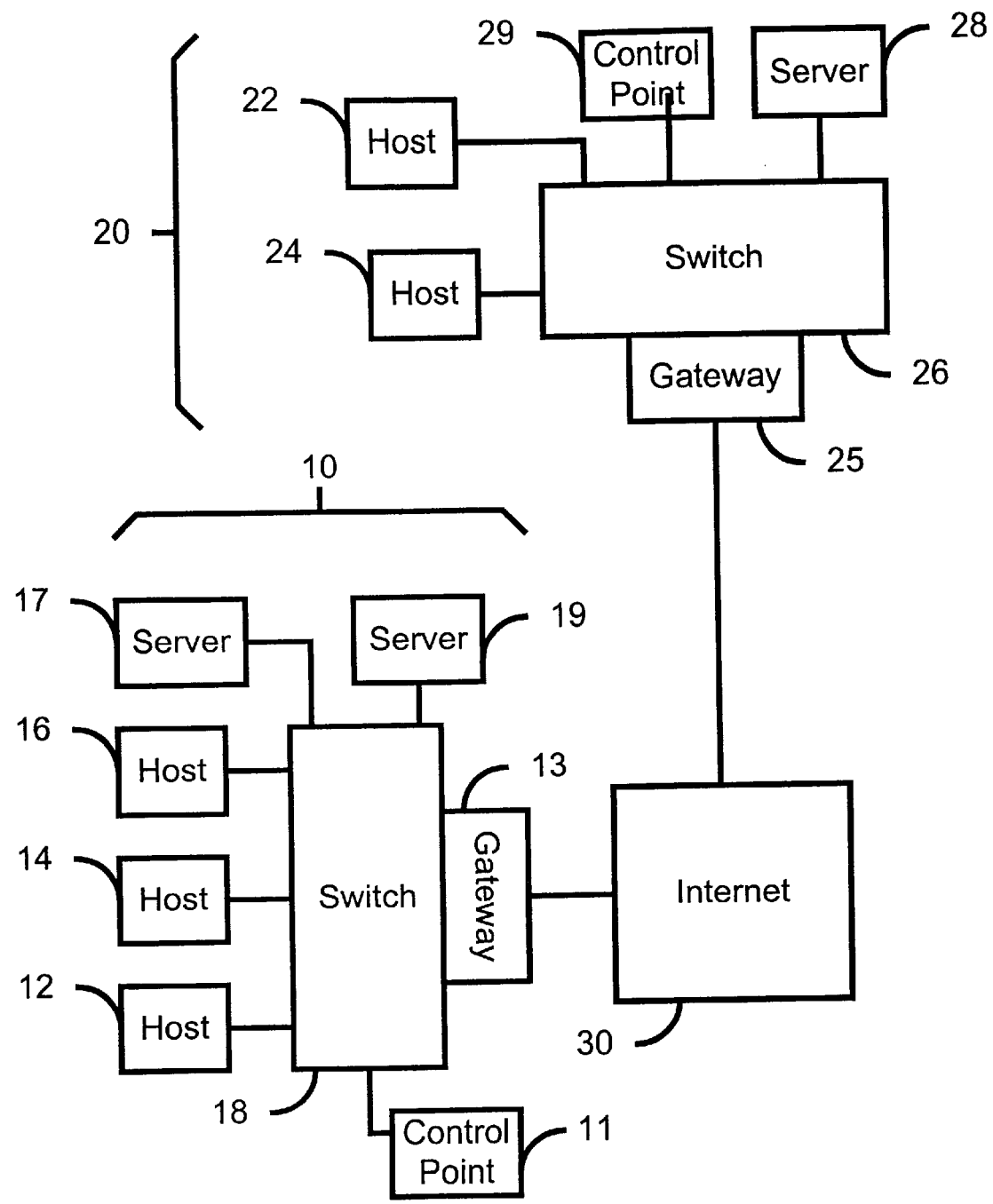
FIG. 1 is a block diagram of systems in which the present invention may be utilized.

FIG. 1 depicts networks 10 and 20 in which the present invention may be used. The networks 10 and 20 may be connected to the Internet 30. Each network 10 and 20 includes host 12, 14 and 16 and 22 and 24, respectively. Each network 10 and 20 also includes a switch 18 and 26, respectively, and may include one or more servers such as the servers 17, 19 and 28, respectively. In addition, each network 10 and 20 may include one or more gateways 13 and 25, respectively, to the Internet 30. Not explicitly shown are routers and other portions of the networks 10 and 20 which may also control traffic through the networks 10 and 20 and which will be considered to be inherently depicted by the switches 18 and 26, respectively, and the networks 10 and 20 in general.

Also shown in FIG. 1 are control points 11 and 29 for switches 18 and 26, respectively. The control points 11 and 29 may be general-purpose computers. The control points 11 and 29 provide information to the switches 18 and 26, which may be used in determining whether and how to route traffic. The control points 11 and 29 are described more particularly in co-pending U.S. patent application Ser. No. 09/312,148, entitled "SYSTEM METHOD AND COMPUTER PROGRAM FOR FILTERING USING TREE STRUCTURE" filed on May 14, 1999 and assigned to the assignee of the present application and in co-pending U.S. patent application Ser. No. 09/540,333, entitled "SYSTEM METHOD AND COMPUTER PROGRAM FOR PRIORITIZING FILTER RULES" filed on Mar. 31, 2000 and assigned to the assignee of the present application. Applicant incorporates by reference the above-mentioned co-pending applications. However, the networks 10 and 20 may be implemented without the use of control points 11 and 29, respectively.

The switches 18 and 26 may utilize filter rules in order to control the flow of traffic through the networks 10 and 20, respectively. The filter rules may intersect. Thus, a key from a particular packet may match more than one filter rule. Thus, the filter rules are also accorded a priority. Co-pending U.S. patent application Ser. No. 09/540,333, entitled "SYSTEM METHOD AND COMPUTER PROGRAM FOR PRIORITIZING FILTER RULES" filed on Mar. 31, 2000 and assigned to the assignee of the present application depicts a method, system and computer program for prioritizing filter rules. A user, such as a network administrator, is allowed to set different priorities for filter rules to ensure that no two intersecting filter rules have inconsistent actions. The above-mentioned co-pending application also discusses using a graph in order to understand filter rules, but is silent as to displaying the filter rules on the computer system. The graphical representation of filter rules described uses lines are drawn from lower to higher priority filter intersecting rules. Most conventional systems merely provide a table listing the filter rules and the filter rules' properties. However, one of ordinary skill in the art will readily realize that it is difficult to understand the relationships between filter rules using such a table. This is particularly true when there is a large number of filter rules.

The present invention provides a method and system for graphically representing relationships between a plurality of filter rules in a computer system. The computer system includes a display. Each of the plurality of filter rules has a priority. The method and system comprise allowing entry of at least one filter rule of the plurality of filter rules and providing a graphical display of a first portion of the plurality of filter rules on the display. Each of the first portion of the plurality of filter rules is displayed hierarchically based on the priority of each of the first portion of the plurality of filter rules. If the first portion of plurality of filter rules includes a plurality of intersecting filter rules, then displaying the plurality of intersecting filter rules in the graphical display to indicate at least one intersection of at least one higher priority filter rule and at least one lower priority filter rule and to indicate that the at least one higher priority filter rule dominates the at least one lower priority filter rule.

The present invention will be described in terms of a particular set of filter rules implemented in a particular device. However, one of ordinary skill in the art will readily recognize that this method and system will operate effectively for other filter rules implemented using other devices. One of ordinary skill in the art will also readily recognize that the method and system can be used for other systems which operate using filter rules and in a separate system which can be used to investigate the properties of filter rules without utilizing the filter rules.

Figure 2:
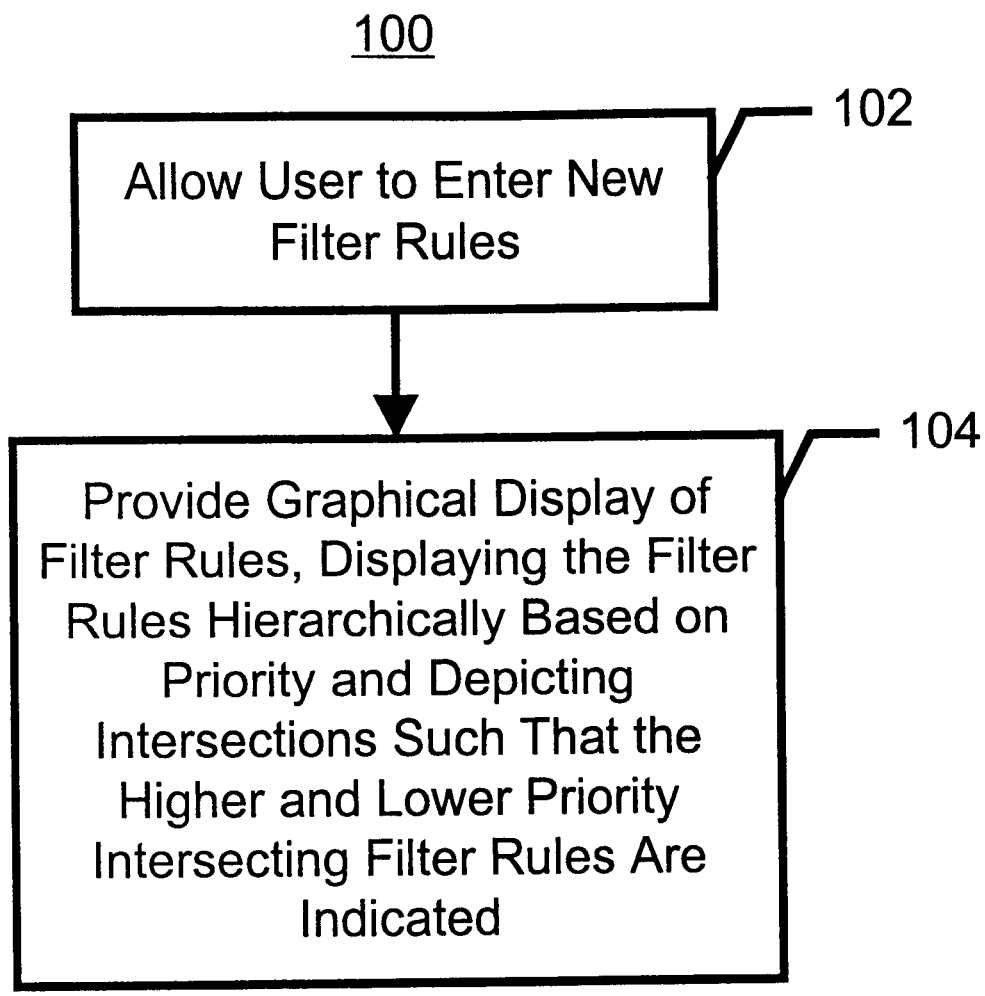
FIG. 2 is a high-level flow chart of one embodiment of a method for graphically displaying filter rules in accordance with the present invention.

To more particularly illustrate the method and system in accordance with the present invention, refer now to FIG. 2, depicting a high-level flow chart of one embodiment of a method 100 for graphically depicting filter rules in accordance with the present invention. The method 100 is preferably used for filter rules which can be employed by the networks 10 and 20. The method 100 is preferably implemented on the networks 10 and 20. For example, a user such as a network administrator might use the method 100 on one of the hosts 12, 14, 16, 22 or 24, then download the filter rules to the switches 18 and 26. However, in an alternate embodiment, the method 100 could be implemented on a stand-alone computer system. Such an embodiment might be used by a developer, for example of the switch 18 or 26, in developing the switch 18 or 26. The filter rules might then be loaded or entered onto the switches 18 and 26 using a different mechanism. In any event, the method 100 is preferably hardware independent.

A user, such as a network administrator, is allowed to enter new filter rule(s), via step 102. Thus, the user is allowed to start a new set of filter rules or add one or more filter rules to an existing set of filter rules in step 102. A graphical display of a portion of the filter rules is provided, via step 104. Thus, the graphical display may be generated automatically by the method 100. The portion of the filter rules displayed in step 104 may include filter rules which are intersecting. In one embodiment, a filter rule which does not intersect any other filter rule may not be displayed. In another embodiment, filter rules which do not intersect other filter rules are displayed. The filter rules which are displayed may include both enabled and disabled filter rules, only enabled filter rules, or only disabled filter rules. Disabled filter rules might be administratively disabled by the user or may be automatically disabled by the system if a logic error is found, for example during logic checking (discussed below). Each of the filter rules is displayed hierarchically based on the priority of filter rule. Preferably, a filter rule with a higher priority, and thus a lower priority number (with one being the highest priority number for a filter rule) will be displayed higher on the graph. Filter rules with lower priorities will preferably be depicted lower in the graph, with the lowest priority filter rules residing at the bottom of the graph. Note that disabled filter rules may be considered to have a projected priority, while enabled filter rules have a priority. The projected priority is preferably the priority of the filter rule when the filter rule is disabled. When displaying disabled filter rules, the method 100 would display disabled filter rules hierarchically using the projected priority in lieu of the priority. For the purposes of this application, therefore, when methods are discussed as performing a step related to priority, then the step may be considered to be performed for projected priorities. For example, when priorities of (enabled) filter rules are determined or used, the projected priorities of the disabled filter rules may also be determined or used as appropriate. However, the step may be performed differently for the projected priority than for the priority. For example, the disabled filter rules are preferably ignored when calculating the priorities of the enabled filter rules. Thus, for enabled filter rules the priorities are preferably calculated, while for disabled filter rules the projected priorities are preferably simply the priority of the filter rules at the times the filter rules were disabled. Thus, filter rules are preferably displayed hierarchically such that the height, of the filter rule corresponds to the filter rule's priority. However, another mechanism for indicating the hierarchy of the filter rules may be used. For example, the filter rules may be ordered horizontally based on their priority. The graphical display of the filter rules also indicates the intersections between filter rules. This indication also informs the user which intersecting filter rule has the higher priority. The user is thus informed that the higher priority filter rule dominates the lower priority filter rule. Preferably, this is accomplished through the use of a segment from the higher priority filter rule to the lower priority filter rule. Thus, the user can easily see the relationships between filter rules including the priority of the filter rules, the intersections between filter rules, and which of the intersecting filter rules dominates because it has the higher priority. As a result, the user may be able to determine whether a filter rule can be deleted, for example because it is always dominated by one or more other filter rules, or the filter rules should otherwise be modified.

Figure 3:
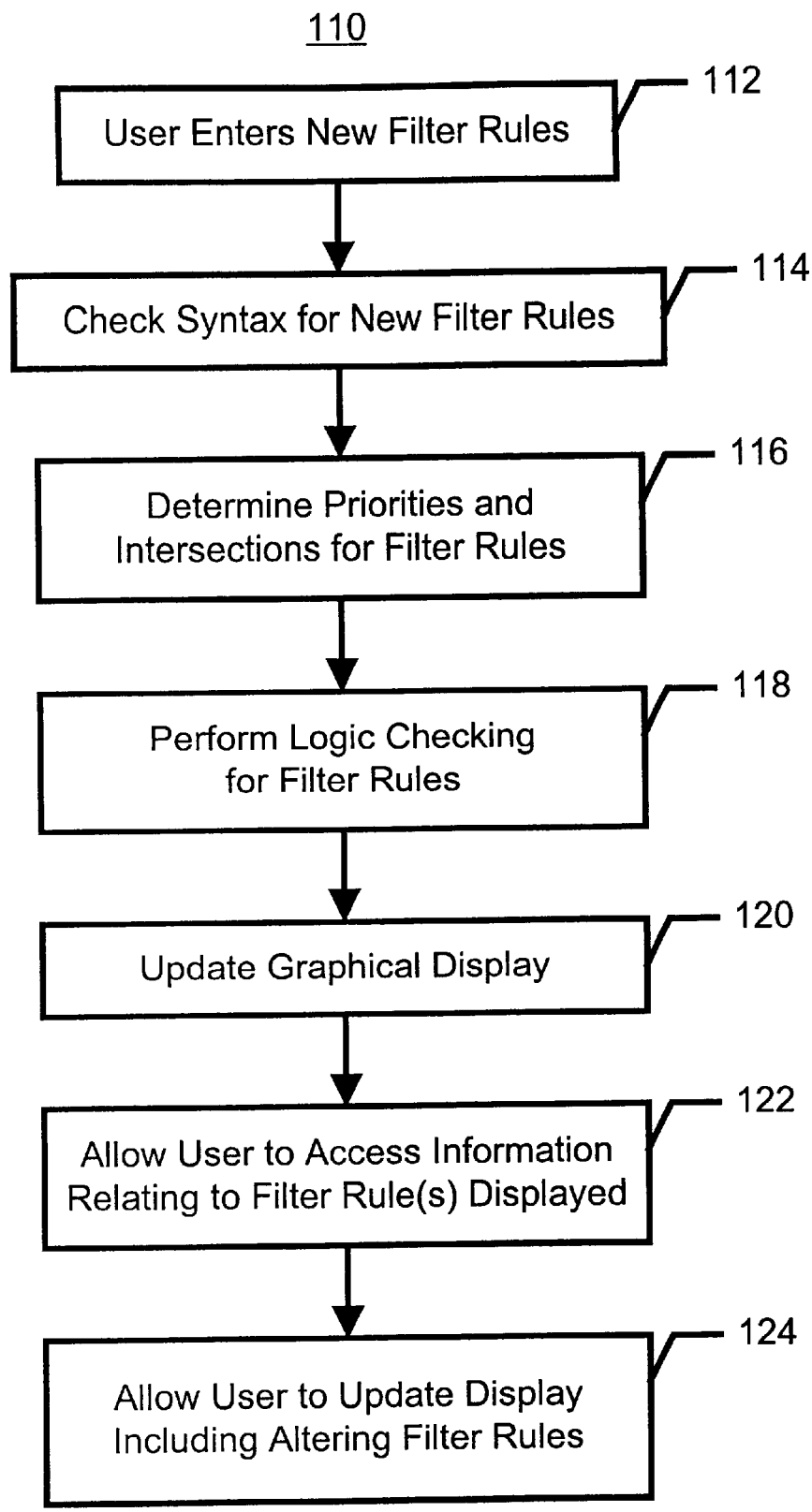
FIG. 3 is a more detailed flow chart of one embodiment of a method for graphically displaying filter rules in accordance with the present invention.

FIG. 3 depicts a more detailed flow chart of a method 110 for graphically depicting filter rules in accordance with the present invention. The method 110 is preferably used for filter rules which can be employed by the networks 10 and 20. The method 110 is preferably implemented on the networks 10 and 20. For example, a user such as a network administrator might use the method 110 on one of the hosts 12, 14, 16, 22 or 24, then download the filter rules to the switches 18 and 26. However, in an alternate embodiment, the method 110 could be implemented on a stand-alone computer system. Such an embodiment might be used by a developer, for example of the switch 18 or 26, in developing the switch 18 or 20.The filter rules might then be loaded onto the switches 18 and 26 using a different mechanism. In any event, the method 110 is preferably hardware independent.

A user is allowed to enter a new filter rule(s), via step 112. Note that new filter rule may be provided via the graphical display, as discussed below. The new filter rule(s) can be the only new rules in a set of filter rules, can be added to an existing set of filter rules, or can replace some filter rules in an existing set of filter rules. The syntax of the new filter rule(s) is checked, via step 114. It is thus ensured that the new filter rule(s) are properly written. For example, the fields corresponding to portions of the IP header may be checked to ensure that the ranges given are valid. The intersections between the new filter rules and between the new filter rules and existing filter rules as well as the priority of the new filter rule(s) are determined, via step 116. The logic for the new filter rule(s) is optionally checked, via step 118. Preferably inclusions (discussed below) and cyclic relationships (discussed below) are identified in step 118. Step 118 may also include taking the appropriate action based on the logic check, such as disabling one or more filter rules. The graphical display is generated or updated with the new filter rules, via step 120. Thus, the graphical display may be generated or updated automatically by the method 110. The intersections and priorities of the new filter rules are thus displayed in step 120. The graphical display depicts the filter rules hierarchically, based on priority and depicts intersections between filter rules. The mechanism for indicating the intersection between filter rules also displays which intersecting filter rule has the higher priority. Preferably, the graphical display has the same properties as discussed above with respect to the method 100 in FIG. 2.

Referring back to FIG. 3, the user is preferably allowed to access additional information about the filter rules through the graphical display, via step 122. In a preferred embodiment, the filter rules are represented by icons in the graphical display. In such an embodiment, step 122 includes allowing the user to click on the icons representing filter rules to obtain additional information. In one embodiment, a user may be allowed to edit information about the filter rule when it has been obtained as discussed above. Also in a preferred embodiment, the user is allowed to update the graphical display, via step 124. For example, the user may scale the graphical display or zoom into a portion of the graphical display in order to more easily see certain filter rules. Preferably, step 124 also includes allowing the user to perform operations on the filter rules through the graphical display. For example, a user may remove or change the priority of filter rules by altering portions of the graphical display. For example, a user may delete, disable or enable a filter rule using the icon for the filter rule. The user may also alter the priority for the filter rule by dragging and dropping the icon for the filter rule. In addition, a user may also be able to add other filter rules from the graphical interface in step 124.

Thus, the user can easily identify relationships, such as priorities, intersections and whether a particular filter rule dominates another filter rule. As a result, the user may be able to determine whether a filter rule can be deleted, for example because it is always dominated by one or more other filter rules. In addition, the new filter rules can be checked for correct syntax and logic, including allowing a user to set the priorities of new filter rules. The user is also allowed to update the graphical display, for example to better view the relationships between filter rules in a portion of the graphical display. The user is also allowed to access additional information about the filter rules through the graphical display. The user may change properties of the filter rules as well as change the graphical display. Thus, the user's ability to easily understand and control the filter rules described in the graphical display is further improved.

Figure 4A:
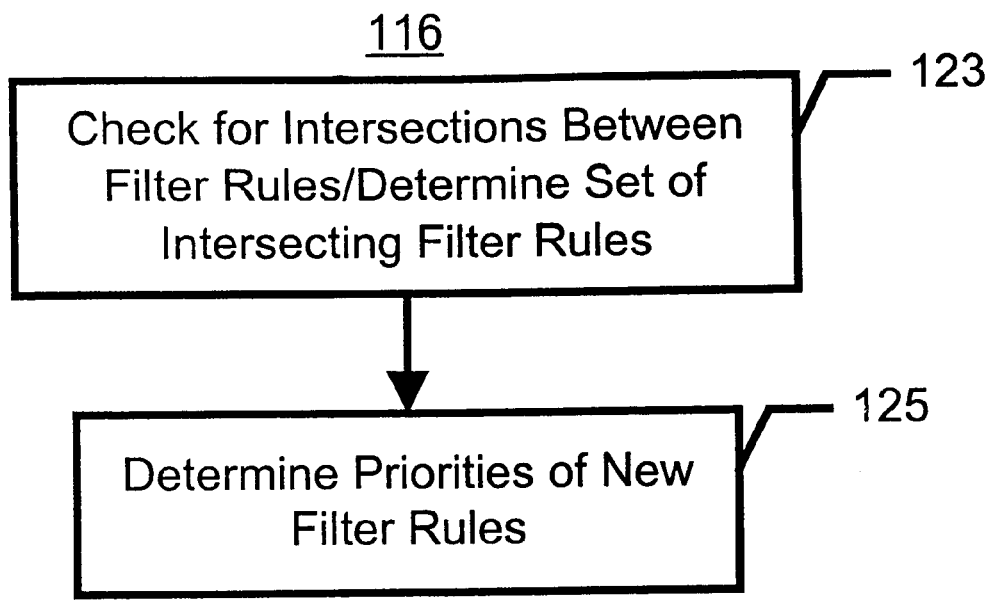
FIG. 4A is a flow chart of one embodiment of a method for determining the intersections and priorities of filter rules in accordance with the present invention.

FIG. 4A depicts one embodiment of the step 116 of determining the intersections and priorities of the filter rules. The intersections between new filter rules are determined, via step 123. Thus, step 123 determines which of the new filter rules can match the same keys as other new filter rules or other existing filter rules. In step 123, therefore, the set of intersecting rules is preferably determined. The priority of the new filter rules is then determined, via step 125. Thus, both the priority and the intersections of the filter rules are determined.

FIG. 4B depicts one embodiment of the step 125, determining the priority of the new filter rules. The step 125 depicted in FIG. 4B is preferably performed for each of the new filter rules. The priority numbers of the intersecting filter rules are calculated if not already known, via step 126. Preferably, the priority of all filter rules was previously calculated. For example, the method for calculating priority numbers in above-mentioned co-pending U.S. patent application Ser. No. 09/540,333, entitled "SYSTEM METHOD AND COMPUTER PROGRAM FOR PRIORITIZING FILTER RULES" can be used in determining priority numbers. However, the method 125 can also simply determine the relative priority of the filter rules. In other words, the method 125 can determine which filter rules have higher or lower priority than other filter rules without explicitly determining the priority number for the filter rules.

The intersecting filter rules, which were determined in step 124 of the method 116 of FIG. 4A, are ordered by priority, if known, in a list, via step 128. If the priorities of the filter rules are not known, then step 128 may be skipped. The highest priority rule in the list of intersecting rules is selected and removed from the list of intersecting filter rules, via step 130. The highest priority filter rule is preferably the first filter rule in the list because of the ordering in step 128. However, if the filter rule priorities are not known, then any filter rule may be selected from set of intersecting rules and removed from the set in step 130.

It is determined whether the priority relationship, or directed path, between the selected rule and a new filter rule is explicitly known, via step 132. The new filter rule is the filter rule whose priority is being set. The priority relationship determines which of the selected filter rule and the new filter rule has a higher priority and how different the priorities are. If the priority relationship is explicitly known, then the priority of the new filter rule with respect to the selected filter rule is known. The method would then skip to step 138, determining whether there are additional intersecting filter rules with which the new rule is to be compared. However, if the priority relationship is not known, then the user is asked to select the higher priority filter rule of two filter rules, a new filter rule and the selected filter rule, via step 134. The user then enters the identity of the filter rule having the higher priority, via step 136. It is then determined whether there are additional filter rules in the list of intersecting filter rules, via step 138. If not, then the method 125 ends for the new filter rule. If so, then the method returns to step 130, allowing another filter rule in the set of intersecting rules to be selected for comparison in step 130. The steps 130 through 138 are repeated until the new filter rule has been compared against the intersecting filter rules so that the priority of the new filter rule is determined. Thus, the user is led through steps, each of which is relatively simple for the user to perform, in order to set the priority of a new filter rule. The priority of the filter rule is determined without the user having to remember the priority numbers corresponding to particular filter rules. Instead, a user must merely understand which of two filter rules has a higher priority. As a result, the user can easily set the priority of the new filter rules based on comparisons to other filter rules.

Figure 4C:
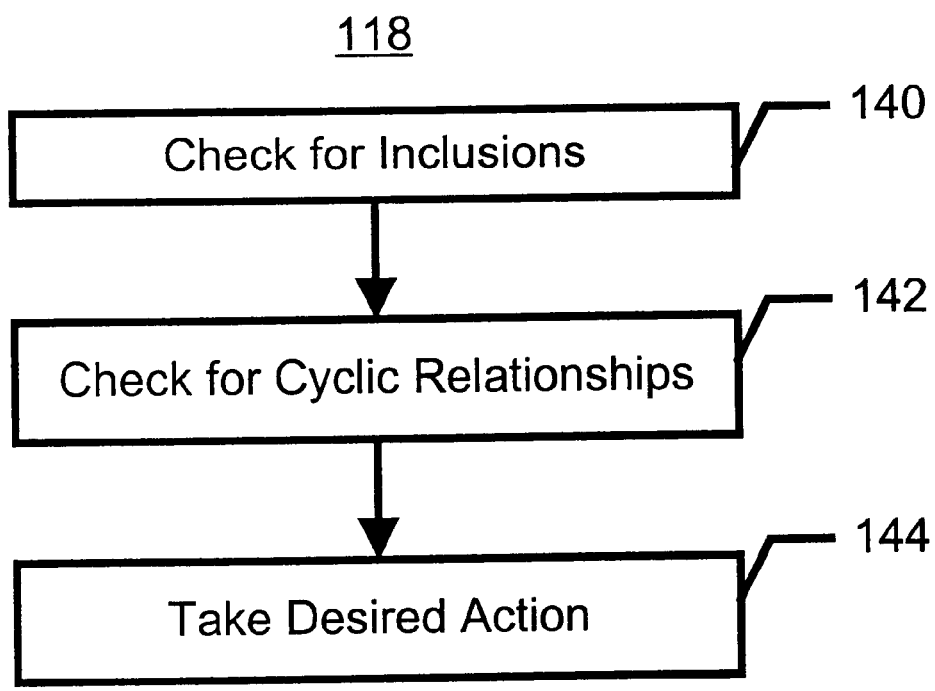
FIG. 4C is a high-level flow chart of one embodiment of a method for performing logic checking in accordance with the present invention.

FIG. 4C depicts one embodiment of a method for performing the step 118, performing logic checking for the new filter rule(s). The new filter rule(s) are checked for inclusions, via step 140. Inclusions occur when every key that would match one filter rule would also match another filter rule. For example, suppose filter rules A and B have different fields. For each field i, the range that would match the rule A is $[a_i, A_i]$. Similarly, for each field i, the range that would match the rule B is $[b_i, B_i]$. Filter rule A is included in filter rule B when $b_i$ is less than or equal to $a_i$ and $B_i$ is greater than or equal to $A_i$.

Cyclic relationships are checked for in step 142. A cyclic relationship occurs when multiple filter rules intersect and the priorities of the intersecting filter rules were declared in such a way that it cannot be determined which rule has the highest priority. For example, suppose there are three filter rules A, B and C. The priorities have been declared such that A dominate B, B dominate C and C dominates A. In another embodiment, cyclic relationships can simply be avoided by, for any intersection, checking first for the existence of relative priority (the priority of one rule with respect to another filter rule) before asking the user for the relative priority. For example, suppose the current filter rule set is R12 and R121. R12 and R121 intersect and R12 has the higher priority. Filter rule X is added and intersects both R12 and R121. The user is asked which filter rule has the higher priority between rule X and R12. If the user says that X has higher priority, the user is not asked for the relative priority between X and R121 because it is assumed that the relationships are transitive such that if X has a higher priority than R12 and R12 has a higher priority than R121, then X must have a higher priority than R121. A potential cyclic relationship between X, R12 and R121 is thus prevented.

Appropriate action is taken based on the logic checking, via step 144. Step 144 may includes disabling certain filter rules, deleting certain filter rules, or ignoring the logic error. Certain filter rule(s) causing the logic error are preferably automatically deleted automatically in response to finding a logic error. For example, suppose inclusions were found in step 140. If an inclusion exists, it could be that the included filter rules are identical. Thus, one filter rule is redundant and should be disabled or deleted. Similarly, an inclusion could exist between two filter rules and the two filter rules could specify that contrary actions be enforced. Both actions of both filter rules cannot be enforced. Therefore at least one filter rule should be disabled or deleted. If both rules are included in each other (have the same ranges for the same fields), then both filter rules may be disabled or deleted. However, if a first filter rule is included in and has a lower priority than a second filter rule, then only the first filter rule should be disabled or deleted. Similarly, if a cyclic relationship is found in step 142, then one of the filter rules that creates the cyclic relationship should be disabled or deleted. As a result, the priorities will no longer be cyclic and the appropriate rule to enforce can be determined. Thus, certain filter rules are preferably automatically deleted automatically in response to finding a logic error. However, in another embodiment, another action could be taken in step 144. For example, a user may be allowed the option of selecting whether to ignore the logic error, delete certain filter rules, or disable certain filter rules. In such an embodiment, the option of ignoring the logic error for a cyclic logic error might not be presented in order to ensure that the system can adequately determine the priorities of filter rules.

Thus, by performing logic checking using the method 118, a variety of errors can be accounted for. Unintentional mistakes, for example made when entering information relating to the filter rules, can be identified and corrected. In addition, the filter rules used can be simplified by disabling rules causing logic errors. This relieves the underlying system, for example of the switch 18 or 26 depicted in FIG. 1, from having to perform logic checking. Referring back to FIG. 4C, the method 118 also prevents unexpected packet processing due to logic errors, such as cyclic relationships. Processing of packets is also made more efficient because rules having logic errors will not be checked for a match. In addition, although the method 118 checks for both inclusion and cycle relationships in steps 140 and 142, respectively, in an alternate embodiment, step 140 or 142 could be omitted. Furthermore, the action-taking step 144 may be omitted or changed, for example to providing the user with information relating to the logic errors found.

Figure 4D:
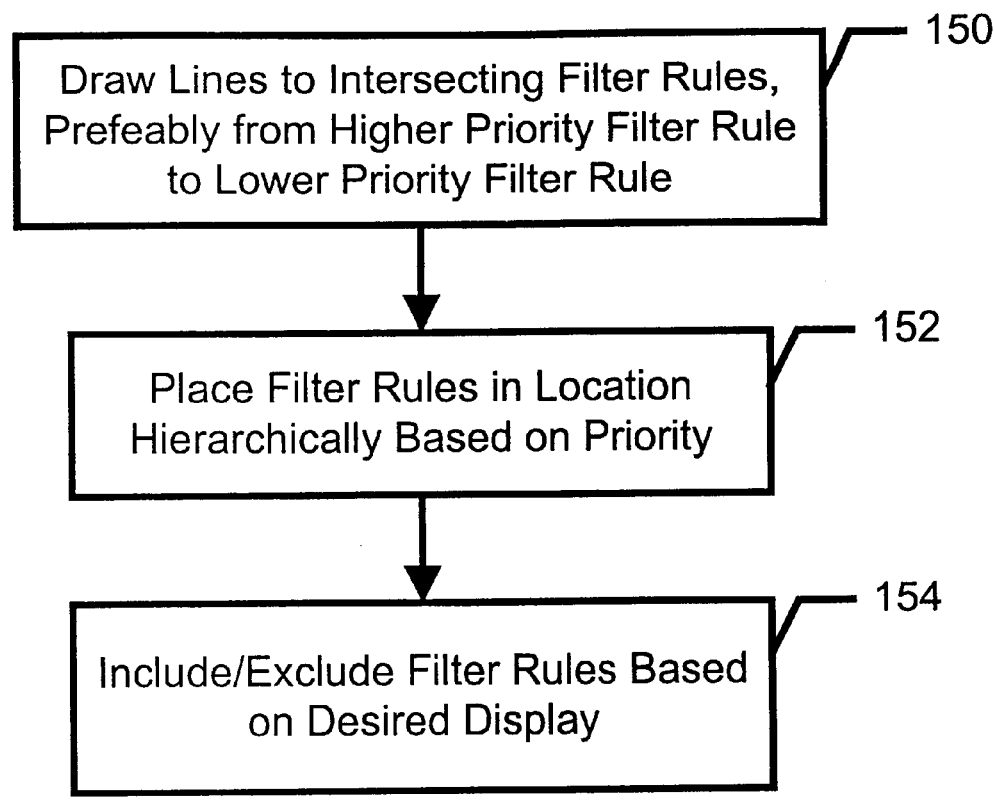
FIG. 4D is a high-level flow chart of one embodiment of a method for updating the graphical display in accordance with the present invention.

FIG. 4D depicts one embodiment of a method for performing step 120, updating the graphical display. Lines are drawn between the intersecting filter rules in order to indicate the intersection, via step 150. Preferably, the lines are drawn from the higher priority intersecting filter rule to the lower priority intersecting filter rule. Thus, priorities are also indicated by step 150. The filter rules are placed in the display in a location that indicates their priority, via step 152. Preferably, the height of the filter rule indicates the filter rule's priority. Thus, the highest priority filter rules are preferably placed at the top of the display in step 152. Also in step 152 filter rules which have the same priority are preferably placed at the same height. Filter rules are then excluded or included based on the user's preferences, via step 154. For example, if the user desires not to see all disabled filter rules, this is accomplished by excluding disabled filter rules from the display in step 154. Thus, the graphical display of the filter rules is provided.

Figure 4E:
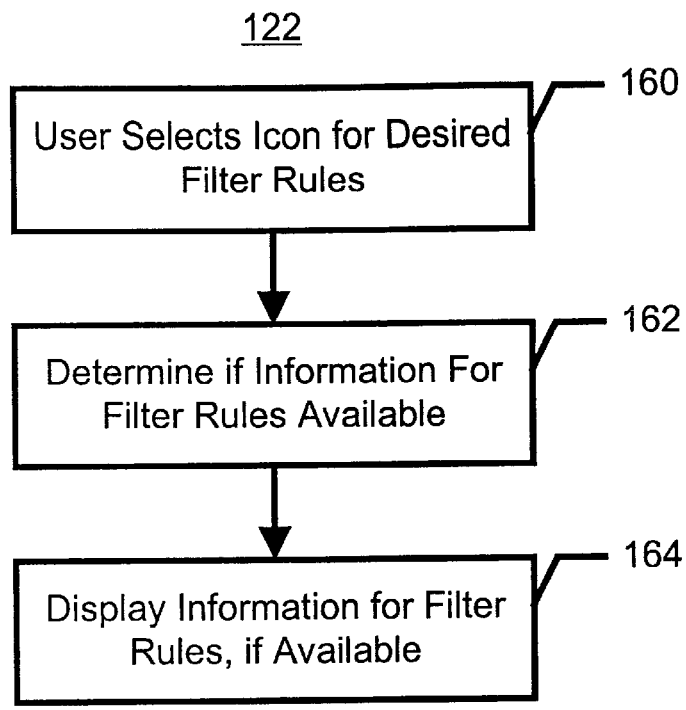
FIG. 4E is a flow chart of one embodiment of a method for allowing a user to access more information about the filter rules in accordance with the present invention.

FIG. 4E depicts one embodiment of a method for performing the step 122, allowing a user to access additional information relating to the filter rules depicted in the graphical display. In a preferred embodiment, each of the filter rules is represented in the graphical display by an icon. Thus, a user selects the icon(s) for the filter rules about which additional information is desired, via step 134. Preferably this is accomplished by the user double clicking a mouse on the desired icon. It may be determined whether additional information is available for viewing, via step 136. If the additional information is available, then it can be displayed to the user, via step 138. The additional information obtained could include information typically available, such as the ranges of keys the filter rule will match and the action enforced by the filter rule. In addition, in some embodiments, other information could be made available. For example, if the actual structure of filter rules implemented by the hardware is known, such information might be provided to the user in step 138. Similarly, if the computer system in which the method 120 is implemented can obtain information about the hit count for a rule, then the hit count could be provided in step 138. The hit count is the number of times a key for a packet matches the filter rule over a particular period. Other information relating to the filter rules and their performance could also be provided. The additional information displayed in step 138 could be displayed on the icon for the rule or could otherwise overlay the graphical display.

Thus, the methods 100 and 110 graphically display filter rules to a user. The graphical display allows the user to quickly identify properties of and relationships between filter rules. For example, the user can more readily identify the priorities of, intersections between, and dominant filter rules. Furthermore, the user can obtain additional information about the filter rules, the availability of which may depend upon the hardware in which the methods 100 and 110 are implemented. The user may change the properties of filter rules, change the filter rules and change the display through the graphical display. Consequently, the user's control over and understanding of the filter rules is improved.

Figure 5:
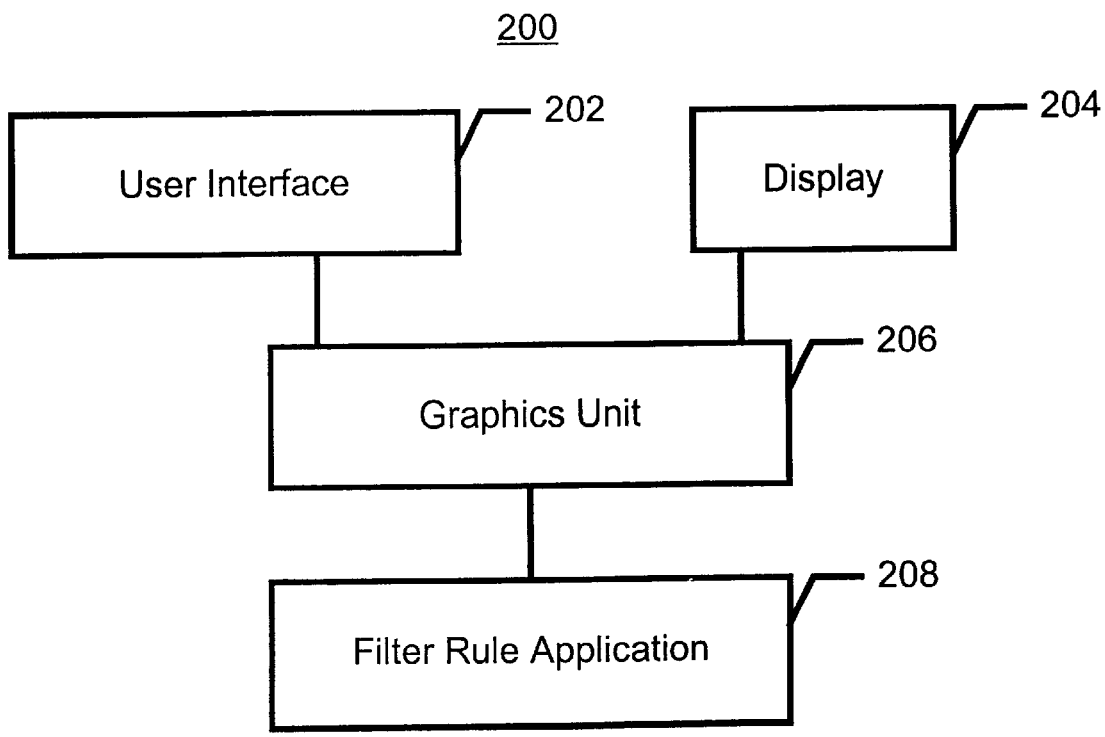
FIG. 5 is a high-level block diagram of a system in accordance with the present invention.

FIG. 5 depicts one embodiment of a system 200 in accordance with the present invention. The system 200 is implemented in a computer system. The system 200 includes a user interface 202, a display 204, a graphics unit 206, and a filter rule application 208. The user interface 202 may include a keyboard and a mouse. The user interface 202 allows a user to enter new filter rules into the system. The display 204 allows information to be displayed to the user. The graphics unit 206 allows filter rules to be graphically displayed. Thus, the graphics unit 206 preferably implements portions of the method 100 and 110. The graphics unit 206 provides data to the display 204 for depiction on the display 204. However, the graphics unit 206 preferably uses the filter rules application 208 to perform some of the operations in the methods 100 and 110. The filter rules application 208 performs syntax checking, logic checking, prioritization of the filter rules and other operations on the filter rules to provide information used by the graphics unit 206 in graphically displaying the filter rules and their relationships.

Figure 6A:
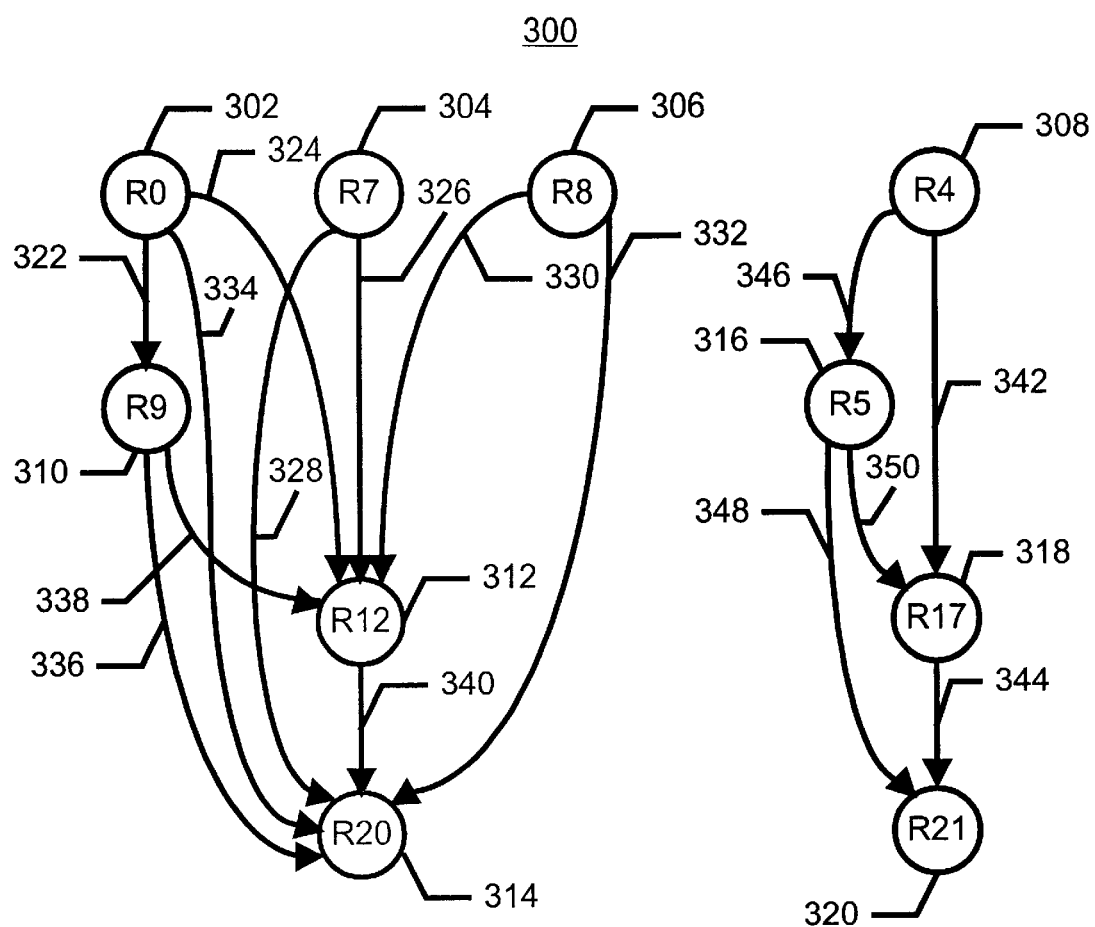
FIG. 6A is a diagram of one embodiment of the graphically displayed filter rules in accordance with the present invention.

FIG. 6A depicts one embodiment of a graphical display 300 in accordance with the present invention. The graphical display 300 may be generated for the filter rules R0, R7, R8, R9, R12, R20, R4, R5, R17 and R21. The graphical display 300 may be generated using the methods 100 and 110. The filter rules are represented by icons R0 302, R7 304, R8 306, R9 310, R12 312, R20 314, R4 308, R5 316, R17 318 and R21 320. Note that although the icons R0 302, R7 304, R8 306, R9 310, R12 312, R20 314, R4 308, R5 316, R17 318 and R21 320 are depicted as circles, nothing prevents the use of differently shaped icons. The icons R0 302, R7 304, R8 306, R9 310, R12 312, R20 314, R4 308, R5 316, R17 318 and R21 320 are placed vertically based on their priority. Each priority has a different height. Thus, the icons R0 302, R7 304, R8 306 and R4 308 have the same and highest position because the rules R0, R7, R8 and R4, respectively, have the same and highest priority. The icons R9 310 and R5 316 have the same and second highest position because the rules R9 and R5 have the same and next highest priority. The icons R12 312 and R17 318 have the same and third highest position because the rules R12 and R17 have the same and third highest priority. The icons R20 314 and R21 320 occupy the lowest position because the corresponding rules R20 and R21 have the lowest priority. Thus, the height of each icon is determined by the corresponding priority.

In one embodiment, the height of the icon for each filter rule is determined by the priority number of the filter rule. In a preferred embodiment, this priority number is determined as follows. For a filter rule R, the set X includes the number of filter rules that dominate R for each path to the filter rule R. For example, for rule R21, the set would be {2,3,2} for filter rules R4 and R5 (the path through icons R4 308 and R5 316 to the icon R21 320), for filter rules R4, R5 and R17 (the path through icons R4 308, R5 316 and R17 318 to the icon R21 320) and for filter rules R4 and R17 (the path through icons R4 308 and R17 318 to the icon R21 320), respectively. The priority number for a rule R is given by (1+highest number in X). For example, the priority number for rule R21 is (1+3), or four. This priority number can be used in the method 125 depicted in FIG. 4B as well as for determining the height of the filter rule in the graphical display 300.

The intersections between filter rules are represented by segments 322, 324, 326, 328, 330, 332, 334, 336, 338, 340, 342, 344, 346, 348 and 350. The segments 322, 324, 326, 328, 330, 332, 334, 336, 338, 340, 342, 344, 346, 348 and 350 point to the lower priority rule of the intersecting rules. For example, the segment 322 between the icons for intersecting rules R0 302 and R12 312 points to the icon for the lower priority rule R12 312. From the graphical display 300, a user can easily tell that filter rules having icons R0 302, R7 304, R8 306 and R4 308 have the highest priority, while filter rules having icons R20 314 and R21 320 have the lowest priority. Similarly, it can be determined which filter rules dominate other filter rules based on the position of the rules and the direction of segment connecting the icons for the filter rules. For example, R0 302 dominates R9 310, R12 312 and R20 314. A filter rule which is dominated by another higher priority filter rule might be a subset of the higher priority filter rule and thus unnecessary. Consequently, from viewing the graphical display 300, a user can easily determine which rules dominate and which rules might be unnecessary. From the graphical display 300 it can also be determined that filter rule R20 may always be dominated by other rules because the remaining filter rules having higher priorities all intersect the filter rule R20. Thus, filter rule R20 may be unnecessary. A user is thus able to easily identify filter rules which might be eliminated from the filter rule set, making the filter rule set more efficient. However, it may be necessary to modify the rule set in order to eliminate a filer rule. It can also be readily determined from the graphical display 300 that filter rules R4 308, R5 316, R117 318 and R21 320 are independent of filter rules R0 302, R7 304, R8 306, R9, 310, R12 312 and R20 314. This is because there are no segments between these two groups of filter rules. Thus, the priorities of and relationships between filter rules and groups of filter rules can be determined.

Figure 6B:
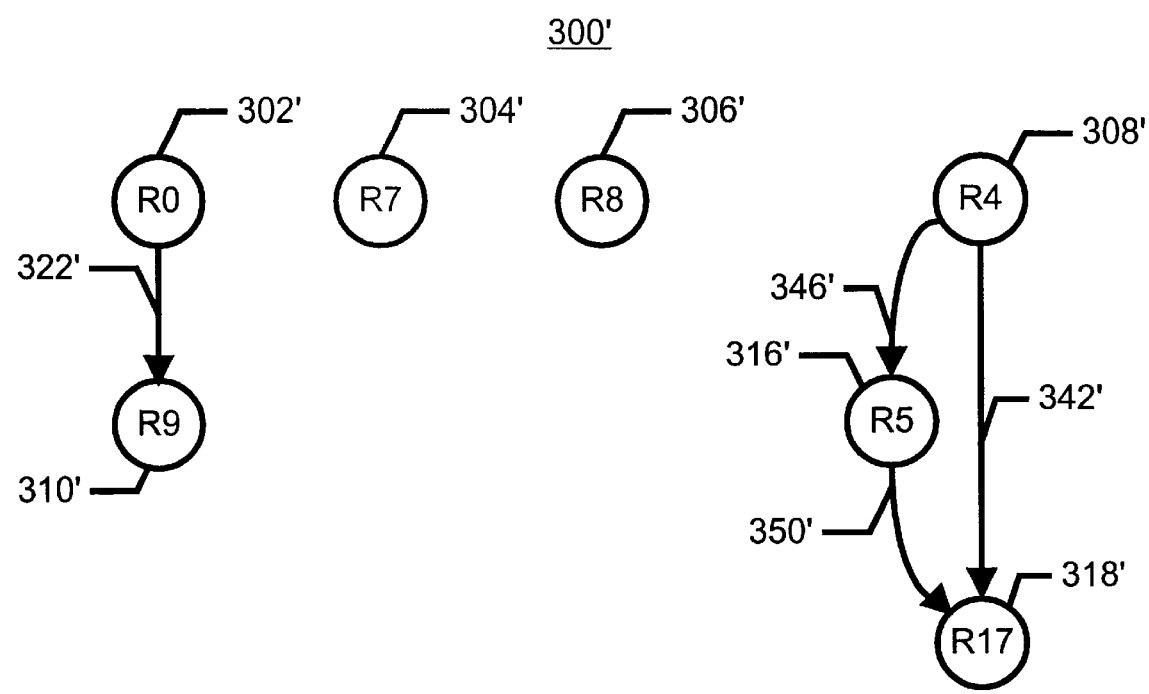
FIG. 6B is a diagram of a second embodiment of the graphically displayed filter rules in accordance with the present invention.

Suppose the graphical display 300 depicted in FIG. 6A displays a certain portion of the filter rules, such as all filter rules. Other graphical displays might depict a different portion of the filter rules. For example, filter rules which are disabled, such as R12 312, R20 314 and R17 318 might be removed. Icons for filter rules which might be eliminated, such as R20, might also be removed. For example, FIG. 6B depicts the graphical display 300' when rules R12, R20 and R21 have been disabled. Most of the graphical display 300' thus corresponds to the graphical display 300 depicted in FIG. 6A. Referring back to FIG. 6B, the icons for disabled filter rules R12 312, R20 314 and R21 320 are no longer depicted and the segments connecting these disabled filter rules to the remaining filter rules are not shown. Instead, the filter rules R0 302', R7 304' R8 306', R9 310', R4 308' R8 316' and R17 318' and segments 322', 342', 346' and 348' remain.

Figure 6C:
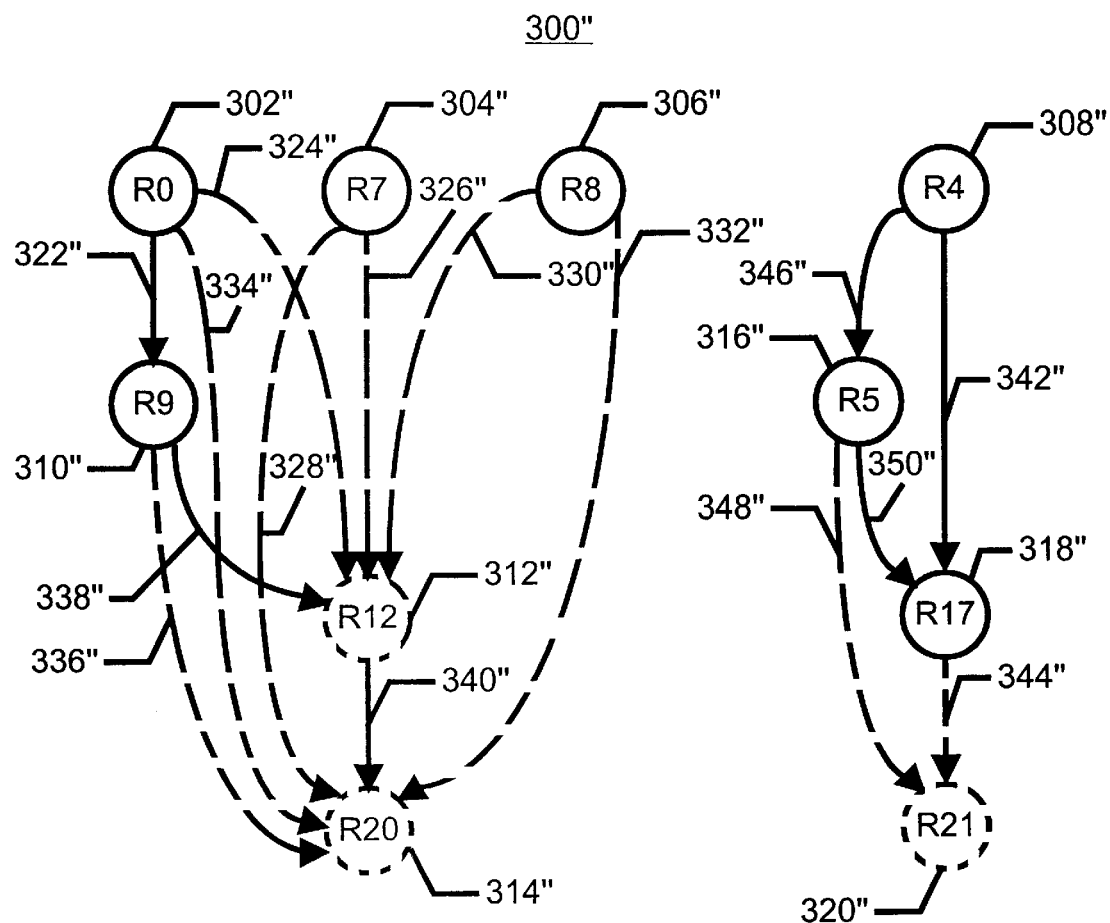
FIG. 6C is a diagram of a third embodiment of the graphically displayed filter rules in accordance with the present invention.

In an alternate embodiment, the disabled filter rules or filter rules which might be eliminated may be shown. However the fact that the filter rule is disabled or redundant might be indicated in another fashion. For example, FIG. 6C depicts the graphical display 300" when the icons for disabled filter rules are shown as dotted icons. Most of the elements of FIG. 6C thus correspond to the elements in the graphical display 300 shown in FIG. 6A. Referring back to FIG. 6C, the icons the icons R12 312", R20 314" and R21 320" for the disabled filter rules R12, R20 and R21 have dotted edges. In addition, the segments 324",326",330" and 338", the segments 340", 328" 334" and 336", and the segments 344" and 348" are dotted to indicate the intersections to the disabled filter rules. In an alternate embodiment, the icons R12 312", R20 314" and R21 320" for the disabled filter rules R12, R20 and R21 could be marked otherwise, for example by shading. Thus, the nature of the disabled filter rules R12 312", R20 314" and R21 320" can be shown.

Referring to FIGS. 6A, 6B and 6C, a user might also be able to change the graphical display 300, 300' and 300", respectively. For example, a user might zoom in on a portion of the graphical displays 300, 300' and 300". In addition, the user might be able to change properties of filter rules through the graphical displays 300, 300' and 300". For example, the user might access more information about filter rule R0 by selecting icon 302, 302' or 302". Information about the filter rule R0 might be overlaid on or replace the graphical display 300, 300' or 300". A user might also change priorities by moving the corresponding icon. For example, to lower the priority of filter rule R0, the icon R0 302, 302' or 302" might be moved to a lower position, for example below the icon R9 310, 310' or 310". A filter rule might be deleted by removing its icon. Thus, a user can obtain information about and manipulate the properties of filter rules through the graphical displays.

Thus, the graphical displays 300, 300' and 300" graphically display filter rules to a user based on the priorities of and intersections between the filter rules. The graphical display allows the user to quickly identify properties of and relationships between filter rules. For example, the user can more readily identify the priorities of filter rules, intersections between filter rules, and the dominant filter rules. Furthermore, the user can obtain additional information about the filter rules, the availability of which may depend upon the hardware in which the methods. The user may change the properties of filter rules, change the filter rules and change the display through the graphical display. Consequently, the user's control over and understanding of the filter rules is improved.

A method and system has been disclosed for graphically displaying filter rules and their relationships. Using the method and system in accordance with the present invention, a user may be better able to understand filter rules and their relationships, and make changes if desired. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for graphically representing relationships between a plurality of filter rules in a computer system having a display, each of the plurality of filter rules having a priority, the method comprising the steps of:

(a) allowing entry of at least one filter rule of the plurality of filter rules; and (b) providing a graphical display of a first portion of the plurality of filter rules on the display, each of the first portion of the plurality of filter rules being placed hierarchically in the graphical display based on the priority of each of the first portion of the plurality of filter rules, and if the first portion of plurality of filter rules includes a plurality of intersecting filter rules, then the plurality of intersecting filter rules being displayed in the graphical display to indicate at least one intersection of at least one higher priority filter rule and at least one lower priority filter rule and to indicate that the at least one higher priority filter rule dominates the at least one lower priority filter rule.

2. The method of claim 1 wherein the graphical display providing step (b) further includes the step of:

(b1) displaying at least one segment for the at least one intersection, the at least one segment from the at least one higher priority filter rule to the at least one lower priority filter rule if the first portion of plurality of filter rules includes the plurality of intersecting filter rules.

3. The method of claim 1 wherein the graphical display providing step (b) further includes the step of:

(b1) displaying each of the first portion of the plurality of filter rules as an icon.

4. The method of claim 1 further comprising the step of:

(c) allowing a user to access information relating to the first portion of the plurality of filter rules using the graphical display.

5. The method of claim 3 further comprising the step of:

(c) allowing a user to access information relating to the first portion of the plurality of filter rules using the plurality of icons in the graphical display.

6. The method of claim 5 wherein the additional information further includes a hit count for each of the first portion of the plurality of filter rules.

7. The method of claim 5 wherein the additional information further includes information relating to an implemented structure of each of the first portion of the plurality of filter rules.

8. The method of claim 1 further comprising the step of:

(c) checking a logic of the at least one filter rule.

9. The method of claim 1 further comprising the step of:

(c) checking a syntax of the at least one filter rule.

10. The method of claim 1 wherein the graphical display providing step (b) further includes the step of:

(b1) updating a previous graphical display to include the at least one filter rule.

11. The method of claim 1 wherein the first portion of the plurality of filter rules further includes only a plurality of enabled filter rules.

12. The method of claim 1 wherein the first portion of the plurality of filter rules further includes only a plurality of disabled filter rules.

13. The method of claim 1 wherein the first portion of the plurality of filter rules is capable of including a plurality of disabled filter rules and a plurality of disabled filter rules.

14. The method of claim 1 further comprising the step of:

(c) allowing a user to alter the priority of a filter rule of the first portion of the plurality of filter rules by dragging and dropping a representation of the filter rule.

15. The method of claim 1 further comprising the step of:

(c) checking the at least one filter rule against a third portion of the plurality of filter rules to determine whether the at least one filter rule intersects any filter rule of the third portion of the plurality of filter rules.

16. A computer-readable medium containing a program for graphically representing relationships between a plurality of filter rules in a computer system having a display, each of the plurality of filter rules having a priority, the program including instructions for:

(a) allowing entry of at least one filter rule of the plurality of filter rules; and (b) providing a graphical display of a first portion of the plurality of filter rules on the display, each of the first portion of the plurality of filter rules being placed hierarchically in the graphical display based on the priority of each of the first portion of the plurality of filter rules, and if the first portion of plurality of filter rules includes a plurality of intersecting filter rules, then the plurality of intersecting filter rules being displayed in the graphical display to indicate at least one intersection of at least one higher priority filter rule and at least one lower priority filter rule and to indicate that the at least one higher priority filter rule dominates the at least one lower priority filter rule.

17. The computer-readable medium of claim 16 wherein the graphical display providing instructions (b) further includes instructions for:

(b1) displaying at least one segment for the at least one intersection, the at least one segment from the at least one higher priority filter rule to the at least one lower priority filter rule if the first portion of plurality of filter rules includes the plurality of intersecting filter rules.

18. A system for graphically representing relationships between a plurality of filter rules in a computer system, each of the plurality of filter rules having a priority, the system comprising:

a display;

an interface for allowing a user to enter at least one filter rule of the plurality of filter rules; and a graphics unit for providing a graphical display of a first portion of the plurality of filter rules on the display, each of the first portion of the plurality of filter rules being placed hierarchically in the graphical display based on the priority of each of the first portion of the plurality of filter rules, and if the first portion of plurality of filter rules includes a plurality of intersecting filter rules, then the plurality of intersecting filter rules being displayed in the graphical display to indicate at least one intersection of at least one higher priority filter rule and at least one lower priority filter rule and to indicate that the at least one higher priority filter rule dominates the at least one lower priority filter rule.

19. The system of claim 18 wherein the graphics unit further displays at least one segment for the at least one intersection if the first portion of the plurality of filter rules includes the plurality of intersecting filter rules, the at least one segment from the at least one higher priority filter rule to the at least one lower priority filter rule.

20. The system of claim 18 wherein the graphics unit further displays each of the first portion of the plurality of filter rules as an icon.

21. The system of claim 18 wherein the graphics unit further includes allows a user to access information relating to the first portion of the plurality of filter rules using the graphical display.

22. The system of claim 21 wherein the graphics unit further allows a user to access information relating to the first portion of the plurality of filter rules using the plurality of icons in the graphical display.

23. The system of claim 22 wherein the additional information further includes a hit count for each of the first portion of the plurality of filter rules.

24. The system of claim 22 wherein the additional information further includes information relating to an implemented structure of each of the first portion of the plurality of filter rules.

25. The system of claim 18 further comprising:

a filter rule application for checking for a logic of the at least one filter rule.

26. The system of claim 18 further comprising:

a filter rule application for checking for a syntax of the at least one filter rule.

27. The system of claim 18 wherein the graphics unit further updates a previous graphical display to include the at least one filter rule.

28. The system of claim 18 wherein the first portion of the plurality of filter rules further includes only a plurality of disabled filter rules.

29. The system of claim 18 wherein the first portion of the plurality of filter rules is capable of including a plurality of disabled filter rules and a plurality of disabled filter rules.

30. The system of claim 18 further comprising means for allowing a user to alter the priority of a filter rule of the first portion of the plurality of filter rules by dragging and dropping a representation of the filter rule.

31. The system of claim 18 wherein the graphics unit further checks the at least one filter rule against a third portion of the plurality of filter rules to determine whether the at least one filter rule intersects any filter rule of the third portion of the plurality of filter rules.

* * * * *